(12) United States Patent
LaBerge

(10) Patent No.: US 6,771,526 B2
(45) Date of Patent: Aug. 3, 2004

(54) METHOD AND APPARATUS FOR DATA TRANSFER

(75) Inventor: Paul A. LaBerge, Shoreview, MN (US)

(73) Assignee: Micron Technology, Inc., Boise, ID (US)

( * ) Notice: Subject to any disclaimer, the term of this patent is extended or adjusted under 35 U.S.C. 154(b) by 3 days.

(21) Appl. No.: 10/073,475

(22) Filed: Feb. 11, 2002

(65) Prior Publication Data

US 2003/0151939 A1 Aug. 14, 2003

(51) Int. Cl.[7] .............................. G11C 5/06; G11C 8/00
(52) U.S. Cl. ................ 365/63; 365/189.03; 365/230.03
(58) Field of Search ............................. 365/63, 189.03, 365/230.03

(56) References Cited

U.S. PATENT DOCUMENTS 5,497,498 A * 3/1996 Taylor ........................ 710/104
5,995,405 A * 11/1999 Trick ............................ 365/63
6,055,600 A * 4/2000 Nguyen et al. ............. 711/100
6,148,398 A * 11/2000 Chang et al. .................. 713/1
6,532,526 B2 * 3/2003 Nizar et al. ................. 711/170

* cited by examiner

Primary Examiner—Michael S. Lebentritt
Assistant Examiner—J. H. Hur
(74) Attorney, Agent, or Firm—Snell & Wilmer L.L.P.

(57) ABSTRACT

An electronic system includes a memory module configured to operate in multiple modes. The memory module includes at least one connection configured to perform different functions when the memory module is operating in different modes. In one embodiment, the memory operates in a normal mode and an SPD mode. While in SPD mode, the connection performs one or more SPD functions, such as operating as an SMBus interface connection. In normal mode, the connection serves a function associated with normal operation of the module, such as addressing functions.

20 Claims, 4 Drawing Sheets

METHOD AND APPARATUS FOR DATA TRANSFER

FIELD OF INVENTION

The invention relates to integrated circuits, and more particularly, to memory systems and storing and accessing data.

BACKGROUND OF THE INVENTION

Many electronic systems include memory to store information. A wide variety of memories are available from many suppliers, and new vendors and types of memory become available frequently. For flexibility purposes, electronic systems commonly accommodate several types of memory, for example by checking the memory to identify its operating parameters and other characteristics. The electronic system may then configure its resources accordingly.

One technique for accommodating different types of memory identifies memory chips with parallel presence detect (PPD) techniques. PPD uses a separate pin for each bit of information, which means that only the speed and density of the memory module are ordinarily provided because of the limited space for pins.

An alternative technique uses serial presence detect (SPD). SPD information is stored in an electrically erasable programmable read-only memory (EEPROM) chip on a memory module that provides supplemental information relating to the memory. Typically, SPD information comprises basic input/output system (BIOS) information, such as the module's type, size, data width, speed, and voltage characteristics. The BIOS uses this information to configure the memory and/or other system resources properly for reliability and performance.

In many systems, the EEPROM on an SPD memory module is accessed for the SPD information during system boot-up via a system management bus (SMBus). Referring to FIG. 6, a processor 602 accesses the SMBus 610 by transmitting signals via a north bridge circuit 602 and a PCI bus 604 to a south bridge circuit 614. The south bridge circuit 614 provides the interface with the SMBus 610, as well as for other low-speed and or low bandwidth devices. The SMBus 610 interfaces with the memory module 612 through multiple pins, such as a serial clock for presence-detect (SCL) pin and a serial presence-detect data (SDA) pin, together with three device address (SA(2:0)) pins.

The addition of pins to accommodate the SMBus for SPD access, however, affects the cost and function of the memory module 612. As the number of pins increases, so does the cost of the memory module 612, especially for high pin-count systems, such as those including 200 to 300 or more pins. Further, each pin occupied by an SPD function displaces other functionality that could be assigned to that pin.

SUMMARY OF THE INVENTION

An electronic system according to various aspects of the present invention is configured to access a memory module that may operate in multiple modes. The memory module includes at least one connection configured to perform different functions when the memory module is operating in the different modes. In one embodiment, the memory operates in a normal mode and an SPD mode. While in SPD mode, the connection performs one or more SPD functions, such as operating as an interface connection to provide SPD information. In normal mode, however, the connection serves a function associated with normal operation of the module, such as addressing functions.

BRIEF DESCRIPTION OF THE DRAWINGS

A more complete understanding of the present invention may be derived by referring to the detailed description and claims when considered in connection with the following illustrative figures, which may not be to scale. In the following figures, like reference numbers refer to similar elements.

Elements in the figures are illustrated for simplicity and clarity and have not necessarily been drawn to scale. For example, the dimensions of some of the elements in the figures may be exaggerated relative to other elements to improve understanding of embodiments.

DETAILED DESCRIPTION

The present invention is described in terms of functional block components and various processing steps. Such functional blocks may be realized by any number of hardware and software components configured to perform specified functions. For example, an apparatus and method according to aspects of the present invention may employ various integrated circuit components, e.g., memory modules, interface elements, logic elements, processing elements, bridge circuits, and the like, which may carry out a variety of functions under the control of one or more processors or other control devices. In addition, the present invention may be practiced in conjunction with any number of storage systems, data transmission protocols, addressing functions and logic to access memory modules, different types of connections, serial presence detect protocols, SMBus protocols, particular memory connections, and buffers. The systems and methods described are merely exemplary applications. Further, the present invention may employ any number of conventional techniques for storing data, data transmission, switching operating modes, data processing, bus control, and the like.

Figure 1:
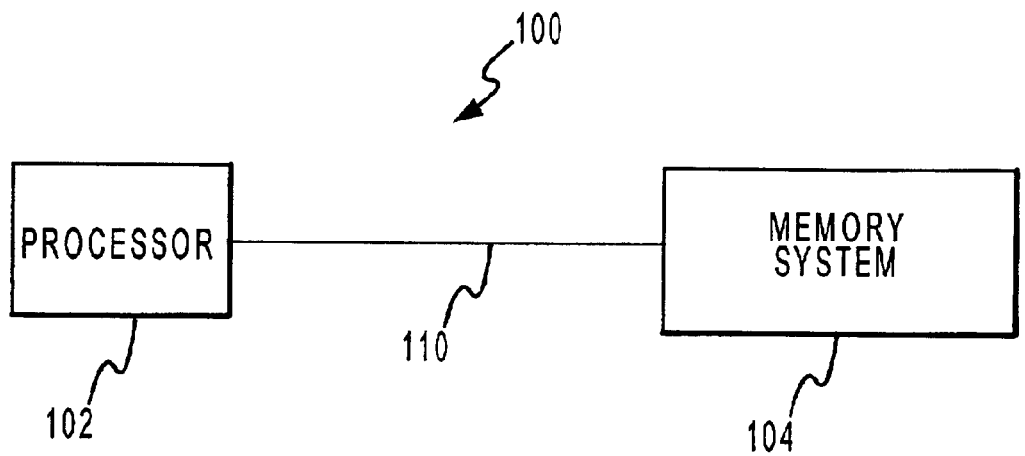
FIG. 1 is a block diagram of an electronic system according to various aspects of the present invention.

Referring to FIG. 1, an electronic system 100 according to various aspects of the present invention may include a processor 102 and a memory system 104. The electronic system 100 comprises a system using a memory, such as a conventional personal computer system. The electronic system 100 may comprise, however, any suitable electronic system, such as a communication system, computing system, entertainment system, control system, portable electronic device, audio component, or factory control system, and the various components may differ according to the particular system and environment. The processor 102 generally controls operation of the electronic system 100, and may comprise any appropriate processor or controller, such as an Intel, Motorola, or Advanced Micro Devices microprocessor or other central processing unit. The processor 102 suitably includes or is associated with other components (not shown) that may operate in conjunction with a CPU, such as a cache system, one or more buses, routing and/or bus manager circuits, BIOS devices, control logic, buffers, and the like. For example, in one embodiment, the processor 102 includes a north bridge circuit configured to route data traffic from one bus to another, such as between a system bus 110 and a PCI bus (not shown), so that memory accesses are handled via the north bridge circuit. In other embodiments, the processor may be replaced by other devices, such as logic circuits or ASICs, or omitted altogether.

The electronic system 100 may be configured to acquire supplemental information from various devices, such as from the memory system 104. In various embodiments, the processor 102 or a component of the processor 102 is configured to acquire the supplemental information, for example during a booting process of the electronic system 100. The supplemental information may comprise any information relevant to operation of the electronic system 100, for example SPD information or other configuration information. In the present embodiment, the processor 102 is configured to acquire SPD information about the memory system 104 used by the system basic input/output system (BIOS) for configuring the memory system 104 or other electronic system 100 parameters.

The processor 102 is connected to the memory system 104. The processor 102 and the memory system 104 may communicate via any appropriate medium, including optical or electrical signals, to obtain the supplemental information from the memory system 104. The medium suitably comprises one or more buses, such as an ISA bus, an XS bus, a system bus and/or a memory bus, to which the processor 102, the memory system 104, and other components may be connected. In the present embodiment, the medium is a 64-bit system bus 110. Communications between the processor 102 and the memory system 104 may be controlled in any appropriate manner and by any suitable component, such as using the processor 102, a memory controller, a bridge circuit, or other circuit or system to control communications. In the present embodiment, communications to acquire the supplemental information from the memory system 104 are controlled and transmitted by the processor 102, including associated logic such as a north bridge circuit.

Figure 2:
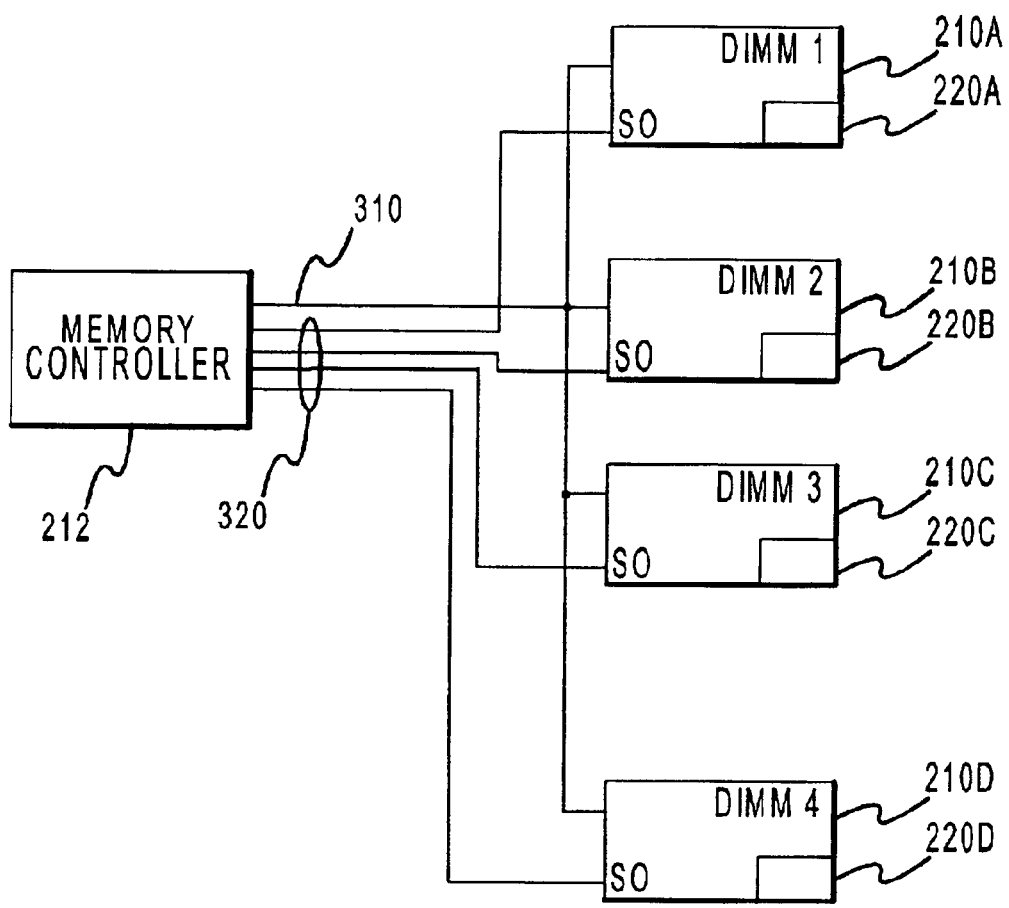
FIG. 2 is a block diagram of a memory system.

The memory system 104 comprises a storage system for storing data. The memory system 104 may comprise any appropriate memory system for storing data and transferring data between the memory system 104 and the processor 102 or another component. Referring to FIG. 2, in the present embodiment, the memory system 104 includes one or more memory modules 210 and a memory controller 212. The memory controller 212 controls access to, including data transfers to and from, the memory modules 210, and may perform further functions and operations. The memory controller 212 may comprise any suitable memory controller for controlling access to the memory modules 210. In some embodiments, the memory controller 212 may be omitted and/or have its functions performed by other system components.

The memory modules 210 may comprise any system for storing data, such as a ROM, SRAM, DRAM, SDRAM, or any other suitable storage system. In the present embodiment, the memory modules 210 comprise at least one memory, such as four Micron dual in-line memory modules (DIMMs) 210A-D having ranks of double data rate synchronous dynamic random access memory (DDR SDRAM). For example, each memory module 210 suitably comprises one or more high-speed CMOS SDRAMs, each of which is suitably internally configured as four banks of SDRAMs. The memory modules 210, however, may comprise any appropriate memory or configuration, such as an individual memory chip, a multi-component device, or another type of storage device. Further, each memory module 210 suitably includes a supplemental information device for storing configuration information, such as an EEPROM 220.

The memory modules 210 interface with the memory controller 212 through any suitable input, output, or other interface or connection, such as a plurality of connections comprising pins, solder, metal connections, optical couplings, or any other suitable coupling. In the present embodiment, the memory module 210 and the memory controller 212 include pins associated with different functions. For example, the memory module 210 and the memory controller 212 may each include bank address pins, row/column addressing pins, data pins, power pins, command pins, and the like. In addition, various pins may be associated with other elements of the memory module 210 or the memory controller 212, such as command buffers associated with the command pins, data buffers associated with the data pins, and address buffers associated with the address pins. The respective sets of pins for the memory controller 212 and the memory module 210 are suitably connected to each other, for example via a memory bus 310.

The memory modules 210 of the present embodiment operate in multiple modes, such as a normal mode and an SPD mode. In a first mode, the memory module 210 operates such that all pins perform a first set of functions. For example, in the normal mode, the pins are assigned functions in accordance with non-SPD or non-configuration operations, such as normal read and write or other ordinary functions associated with the memory module 210. In a second mode, such as the SPD mode, however, one or more of the pins may be assigned an SPD function that is different from the normal function, such as routing information to the SPD device.

The memory module 210 of the present embodiment, for example, includes a plurality of address connections, such as 13 address pins. In normal mode, the address pins operate as address inputs to provide the row addresses and column addresses to select one location of the memory module 210. In SPD mode, however, one or more of the pins is assigned an SPD function. In particular, the pins operating in SPD mode may perform various functions to communicate SPD information in a form used by the requesting device, such as using SMBus communication protocols.

Figure 3:
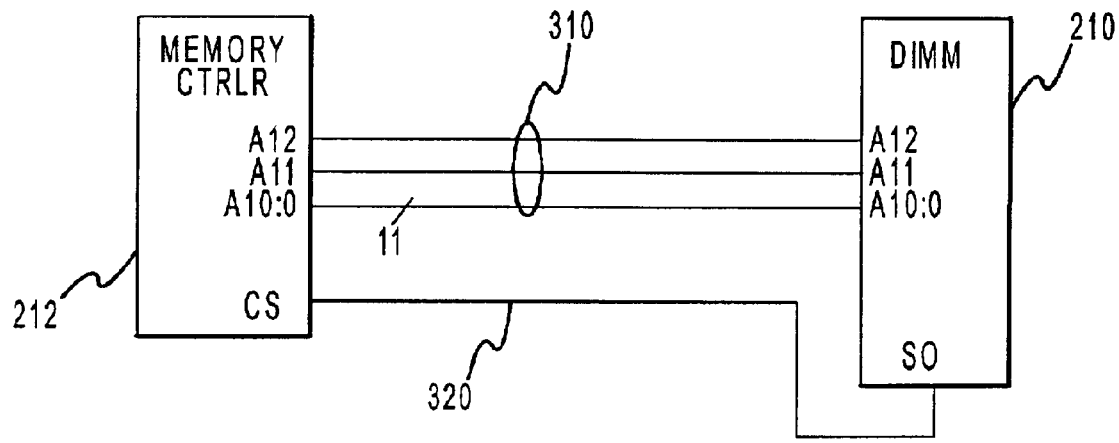
FIG. 3 is a block diagram of a system using dual-mode, bidirectional connections to communicate with an SPD device.

Referring to FIG. 3, in the present embodiment, address pins A12 and A11 of the 13 address pins A[12:0] are suitably configured to perform various functions in different modes. In normal mode, pins A12 and A11 and the associated address buffers function as conventional address inputs to receive their respective bits of address information from the memory bus 310. In SPD mode, pins A12 and A11 and the associated buffers function as SPD information interface pins and buffers. For example, pins A12 and A11 may operate in conjunction with SMBus protocols, such that pin A12 provides the serial clock signal for presence-detect (SCL) connection and pin A11 provides the serial presence-detect data signal (SDA) connection. In this mode, pins A12 and A11 become bi-directional pins and operate in conjunction with serial signals, such as conventional SMBus signals. Pins A12 and A11 functionally emulate the SCL and SDA pins while the memory module 210 is in SPD mode.

Figure 4:
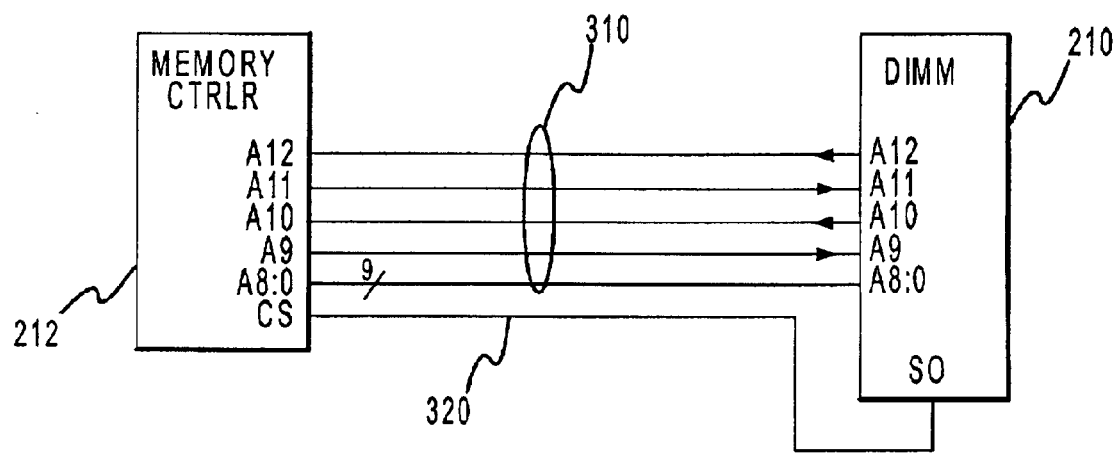
FIG. 4 is a block diagram of a system using dual-mode, unidirectional connections to communicate with an SPD device.
Figure 5:
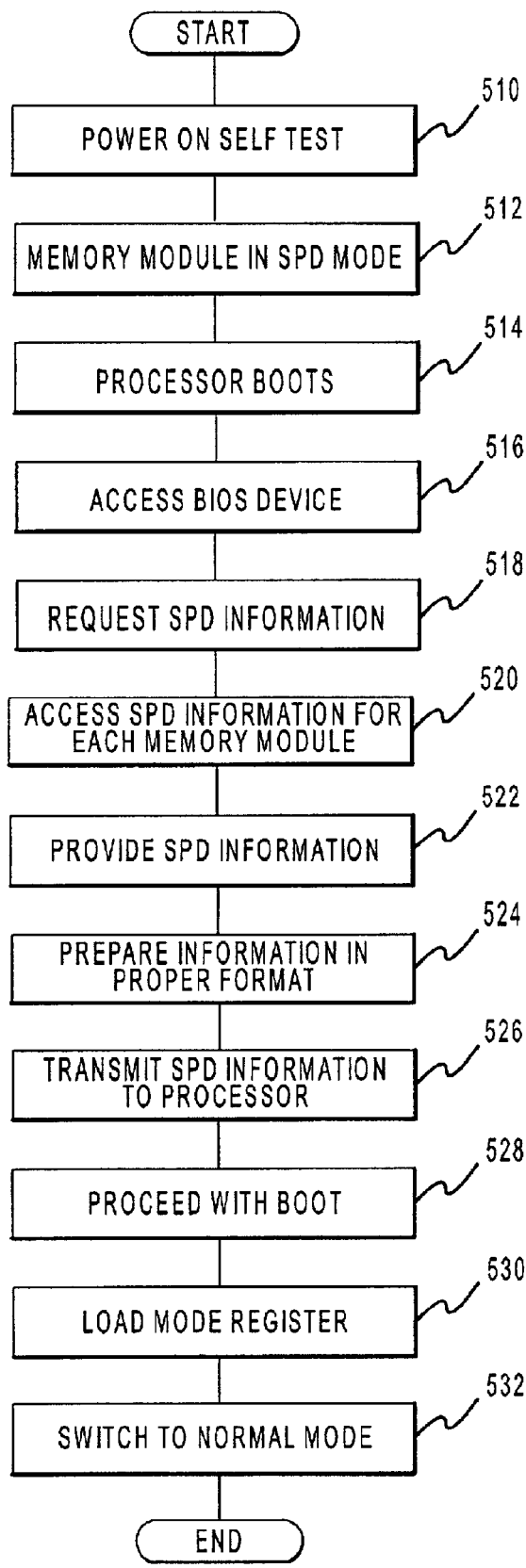
FIG. 5 is a flow diagram of a process for starting a system in SPD mode and proceeding to normal mode.
Figure 6:
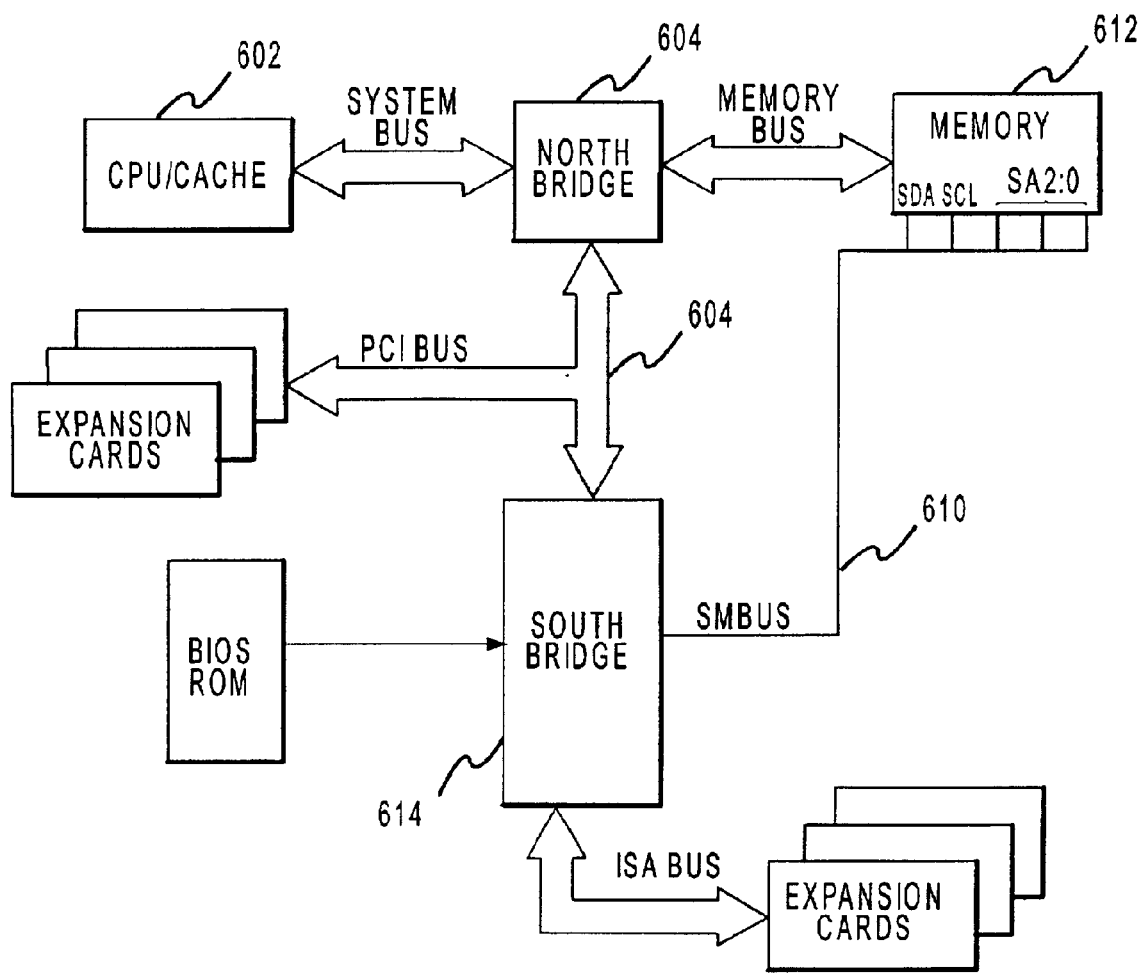
FIG. 6 is a block diagram of a prior art electronic system.

In an alternative embodiment, the functions of the various SMBus signals may be distributed among various pins. For example, referring to FIG. 4, pins A12 and A11 may be unidirectional pins such that pin A12 functions as the SDA output and pin A11 functions as the SDA input. Similarly, other pins, such as pins A10 and A9, are suitably configured to function as the output and input, respectively, for the SCL signal.

Other functions of the SMBus interface may be performed by other pins while the memory module is in SPD mode. In the present embodiment, for example, each memory module 210 includes one or more chip select (S0) inputs connected to a corresponding output of the memory controller 212 (FIG. 2). Thus, the addressing function is performed by omitting the slave address pins SA[2:0] and instead using only the chip select signals (S0) 320. Alternatively, the electronic system 100 may include a selection or arbitration system to facilitate access to multiple memory modules 210 or other components.

The operational mode of the memory module 210 may be controlled in any suitable manner. For example, the memory module 210 may include a mode control pin for receiving control signals to control the mode of the memory module 210. To switch the operation mode of the memory module 210, the processor 102 or other appropriate system changes the signal applied to the memory module 210.

In an alternative embodiment, the operational mode of the memory module 210 may be controlled using commands. For example, while in normal mode, the memory module may respond to an SPD MODE command provided, for example, via the command bus portion of the memory bus 310 or other communication method. To return to normal mode, the memory module 210 may be configured to respond to a NORMAL MODE command received.

In yet another embodiment, the memory module may be configured to automatically switch from one mode to another, for example upon expiration of a timer or receipt of an unrelated command. The memory module 210 may power up in SPD mode and remain in SPD mode during the bootup process for the electronic system 100. At a particular point in the bootup process, such as assertion of a particular command like a LOAD MODE REGISTER command or upon expiration of a timer, the memory module 210 suitably switches to normal mode. The memory module 210 may remain in normal mode until the memory module 210 is powered down or otherwise switched to another mode.

The operative procedure for the electronic system 100 and the various modes of the memory modules 210 may be configured according to the characteristics of the electronic system 100, applications of the electronic system 100, configuration of the memory module 210, or any other appropriate criteria. In the present embodiment, the electronic system 100 is powered up and conducts a power-on self-test procedure (step 510). As power is applied to the memory module 210, the memory module 210 automatically begins operation in the SPD mode (step 512). The processor 102 proceeds to a boot-up procedure (step 514) and retrieves BIOS data (step 516) from a BIOS device.

Upon processing the retrieved BIOS data, the processor 102 may generate a signal requesting SPD information from the memory system 104 (step 518). For example, the processor 102 suitably accesses a configuration register associated with the memory system 104 to set a flag requesting SPD information. The memory controller 212 suitably responds to the SPD request signal by accessing the SPD information stored on the memory modules 210. For example, the memory controller 212 suitably provides serial signals, such as SCL and SDA signals, to pins A12 and A11 of each memory module 210 to access the SPD information (step 520). Because the memory modules 210 are in SPD mode, the signals are recognized as SMBus signals and processed accordingly.

The memory modules 210 provide the SPD information to the memory controller 212, for example using SMBus protocols (step 522). The memory controller 212 suitably converts the information from SMBus format into a format for communication via the system bus (step 524). The processor 102 receives the SPD information (step 526) and proceeds with the boot process (step 528).

The memory modules 210 may then be switched to normal mode. In the present embodiment, the processor 102 completes the boot process and issues a LOAD MODE REGISTER command 210 (step 530). In response to this command, the memory controller 212 suitably provides the LOAD MODE REGISTER command to the memory modules 210, which automatically then switch to normal mode (step 532). The electronic system 100 may then proceed with normal operation.

The particular implementations shown and described illustrate the invention and its best mode and are not intended to otherwise limit the scope of the present invention in any way. For the sake of brevity, conventional signal processing, data transmission, and other functional aspects of the systems (and components of the individual operating components of the systems) may not be described in detail. Furthermore, the connecting lines shown in the various figures are intended to represent exemplary functional relationships and/or physical couplings between the various elements. Many alternative or additional functional relationships or physical connections may be present in a practical electronic system.

The present invention has been described above with reference to a preferred embodiment. However, changes and modifications may be made to the preferred embodiment without departing from the scope of the present invention. These and other changes or modifications are intended to be included within the scope of the present invention, as expressed in the following claims.

What is claimed is:

1. A memory module, comprising:
   a memory configured to store data;
   a supplemental information device configured to store supplemental information comprising SPD configuration information related to the memory module;
   an interface connection connected to the memory and the supplemental information device and configured to operate in a first mode and a second mode, wherein the interface connection:
   transfers information to or from the memory in the first mode; and
   transfers information to or from the supplemental information device in the second mode.

2. A memory module according to claim 1, wherein the interface connection transfers information to or from the supplemental information device in the second mode using SMBus protocols.

3. A memory module according to claim 1, wherein the memory module comprises a chip select connection, and the memory module is selected for information transfers to or from the supplemental information device in the second mode by signaling the memory module via only the chip select connection.

4. A memory module configured to operate in a serial presence-detect (SPD) mode and a normal mode, comprising:

a random access memory (RAM) configured to store information at a location characterized by an address datum;

an SPD device configured to store SPD information; and an address/SMBus connection connected to the RAM and the SPD device and configured to transfer a datum, wherein:

the datum is transferred to or from the RAM when the memory module is operating in normal mode for processing as the address datum; and the datum is transferred as a serial system management bus (SMBus) signal to or from the SPD device when the memory module is operating in SPD mode.

5. A memory module according to claim 4, further comprising a second address/SMBus connection connected to the RAM and the SPD device, wherein:

the first connection transfers a serial clock signal for presence-detect signal; and the second connection transfers a serial presence-detect data signal.

6. A memory module according to claim 4, wherein the memory module comprises a chip select connection, and the memory module is selected for information transfers to or from the SPD device in the SPD mode by signaling the memory module via only the chip select connection.

7. An electronic system having at least two memory modules, wherein each memory module comprises a first connection configured to perform:

a normal function in a normal mode; and a configuration function in a configuration mode wherein the configuration function involves transferring SPD information.

8. An electronic system according to claim 7, wherein the configuration function comprises transferring SPD information according to SMBus protocols.

9. An electronic system according to claim 7, wherein each memory modules comprises a chip select connection, wherein each memory module is addressed by signaling via only the chip select connection.

10. A memory system, comprising:

a memory controller; and a memory responsive to the memory controller and comprising a first connection, wherein:

the memory communicates with the memory controller via the first connection to transfer serial presence detect (SPD) information when the memory is in an SPD mode; and the memory communicates with the memory controller via the first connection to transfer non-SPD information when the memory is in a normal mode.

11. A memory module comprising a multi-function connection, wherein at least one of the functions associated with the multi-function connection is an SMBus interface function.

12. A memory module according to claim 11, wherein:

the memory module operates in multiple modes;

the SMBus interface function is performed by the multi-function connection when the memory module is in an SPD mode.

13. A memory module according to claim 12, wherein the SMBus interface function comprises transferring at least one of a serial clock signal for presence-detect signal and a serial presence-detect data signal.

14. A memory module configured to operate in a normal mode and an SPD mode, wherein:

the memory module comprises a plurality of interface connections;

the interface connections are configured to:

perform a set of memory access functions when the memory module is operating in the normal mode; and perform a set of SMBus interface functions when the memory module is operating in the SPD mode.

15. A memory module configured to operate in a normal mode and an SPD mode, comprising a first connection and a second connection, wherein:

the first and second connections facilitate communication of non-SPD information when the memory module operates in the normal mode; and the first connection facilitates communication of serial clock for presence-detect signals and the second connection facilitates communication of serial presence-detect data signals when the memory module operates in the SPD mode.

16. A method for retrieving configuration information for a memory system from the memory system, comprising:

requesting configuration information from the memory system via a first connection of the memory system while the memory system is in a first mode, wherein the configuration information comprises SPD information;

receiving the configuration information from the memory system via the first connection;

switching the memory system from the first mode to a second mode; and accessing a random access memory location in the memory system via the first connection.

17. A method according to claim 16, wherein requesting configuration information comprises accessing a configuration register associated with the memory system.

18. A method according to claim 16, wherein requesting configuration information comprises providing a signal in conjunction with SMBus protocols via the first connection.

19. A method according to claim 16, wherein requesting configuration information comprises selecting the memory system via only a chip select connection of the memory system.

20. A method for powering up an electronic system, comprising:

providing power to a memory module having an SPD device and a memory;

placing the memory module of the electronic system in an SPD mode;

requesting an SPD information from the SPD device via a first connection on the memory module;

asserting the SPD information via the first connection on the memory module;

switching the memory module from the SPD mode to a normal mode; and accessing a memory location in the memory via the first connection.

* * * * *